United States Patent [19]

Armstrong et al.

[11] 4,034,169

[45] July 5, 1977

[54] ELECTRIC SWITCHGEAR DEVICE WITH INTERLOCKING HANDLE MEANS

[75] Inventors: Donald D. Armstrong, Pittsburgh, Pa.; John R. Wilson, Darien, Ill.

[73] Assignee: Westinghouse Electric Corporation, Pittsburgh, Pa.

[22] Filed: Sept. 11, 1975

[21] Appl. No.: 612,525

[52] U.S. Cl. .......................... 200/50 A; 200/42 T; 361/344; 361/356
[51] Int. Cl.² ........................................ H01H 9/22
[58] Field of Search ............ 317/120; 200/42 T, 44, 200/50 A, 50 AA

[56] References Cited
UNITED STATES PATENTS

| | | | |
|---|---|---|---|
| 3,311,720 | 3/1967 | Johnson | 200/42 T |
| 3,632,917 | 1/1972 | Norden | 200/42 T |

Primary Examiner—Gerald P. Tolin
Attorney, Agent, or Firm—L. P. Johns

[57] ABSTRACT

A control center handle mechanism characterized by a metal cabinet providing a compartment with a plurality of vertical bus bars therein, a circuit interrupter within the compartment and electrically connected to the bus bars and having an operator for actuating the interrupter between open and closed positions, an access door to the compartment on the cabinet, a handle pivotally mounted within the cabinet and operatively connected to the operator, the handle extending through the access door, means for operatively connecting the handle to the operator including link means extending between the handle and the operator, and interlock means between the handle and an access door.

8 Claims, 8 Drawing Figures

ELECTRIC SWITCHGEAR DEVICE WITH INTERLOCKING HANDLE MEANS

CROSS-REFERENCE TO RELATED APPLICATIONS

This invention is related to the copending applications of John R. Wilson and Jerome C. Wolski, Ser. No. 612,526, filed Sept. 11, 1975; Forrest E. Coyle, John R. Wilson, and Brij M. Bharteey, Ser. No. 612,607, filed Sept. 11, 1975; John R. Wilson, Sadiq A. Shariff, and Brij M. Bharteey, Ser. No. 612,605, filed Sept. 11, 1975; John R. Wilson, Neal E. Rowe, and Brij M. Bharteey, Ser. No. 612,606, filed Sept. 11, 1975; Brij M. Bharteey and Neal E. Rowe, Ser. No. 612,604, filed Sept. 11, 1975; and Jerome C. Wolski and Neal E. Rowe, Ser. No. 612,524, filed Sept. 11, 1975.

BACKGROUND OF THE INVENTION

1. Field of the Invention

This invention relates to a motor control center and more particularly it pertains to a handle mechanism for operating the same.

2. Description of the Prior Art

In electrical control apparatus and particularly in motor control centers, power is distributed to power consuming devices through either molded case circuit breakers or fusible switches. These protective devices are available in a wide range of sizes to cover many ratings and other application needs. Moreover, new designs to supersede existing designs are continually being introduced to meet the demands of the market. To the user, these devices present a number of problems. Among these is the need for an operating mechanism to perform the ON, OFF, and RESET functions, as well as to provide a series of equipment interlocking features. Because of the wide range of devices that may be used in a given motor control center, each with its own unique kinematics (center of rotation, angular travel, force required to operate), most of the handle mechanisms currently available simply do not satisfy the problem of actuating the various circuit interrupters that may be contained in a given motor control center. Generally, a handle mechanism should be easy to operate and have aesthetic appeal as well as include interlocking features when required.

SUMMARY OF THE INVENTION

In accordance with this invention it has been found that the foregoing problem has led to the development of a handle mechanism for use with a circuit interrupter located within a metal enclosed control center comprising a cabinet providing a compartment, a plurality of vertical bus bars in the compartment, a circuit interrupter within the compartment and electrically connected to the bus bars, an operator for the circuit interrupter for actuating the interrupter between open and closed positions, an access door to the compartment on the cabinet and having an opening therein, a handle pivotally mounted within the cabinet and operatively connected to the operator, the handle extending through the opening to the exterior of the cabinet, means for operatively connecting the handle to the operator and comprising link means extending to the operator, a handle mounting member comprising a peripheral frame at the opening and inturned wall means forming a recess extending into the compartment, a pivot shaft mounting the handle and journaled within the wall means, the handle being pivotally mounted within the recess, interlock means for holding the access door closed when the handle is in the closed position of the circuit interrupter, the interlock means comprising a latch movable from an unlocked to a locked position of the door when the handle is moved to the closed position, and the latch comprising a strike surface engaging the frame when the door is open and being disengaged upon closing of the door so that the handle is movable to the closed position.

The advantage of the handle mechanism of this invention is that it is adaptable to operate various circuit interrupters, each with different centers of rotation, angular travel, and force required to operate, that in addition to the simple ON/OFF functions it provides visual indication of TRIP and RESET functions, and that door interlock and padlocking features are included.

DESCRIPTION OF THE PREFERRED EMBODIMENTS

The handle mechanism of this invention is useful generally with the control center or switchboard of the type disclosed in U.S. Pat. No. 3,840,785, and more particularly with the control center disclosed in the copending application of Forrest E. Coyle, John R. Wilson, and Brij M. Bharteey, Ser. No. 612,607, filed Sept. 11, 1975.

Figure 1:
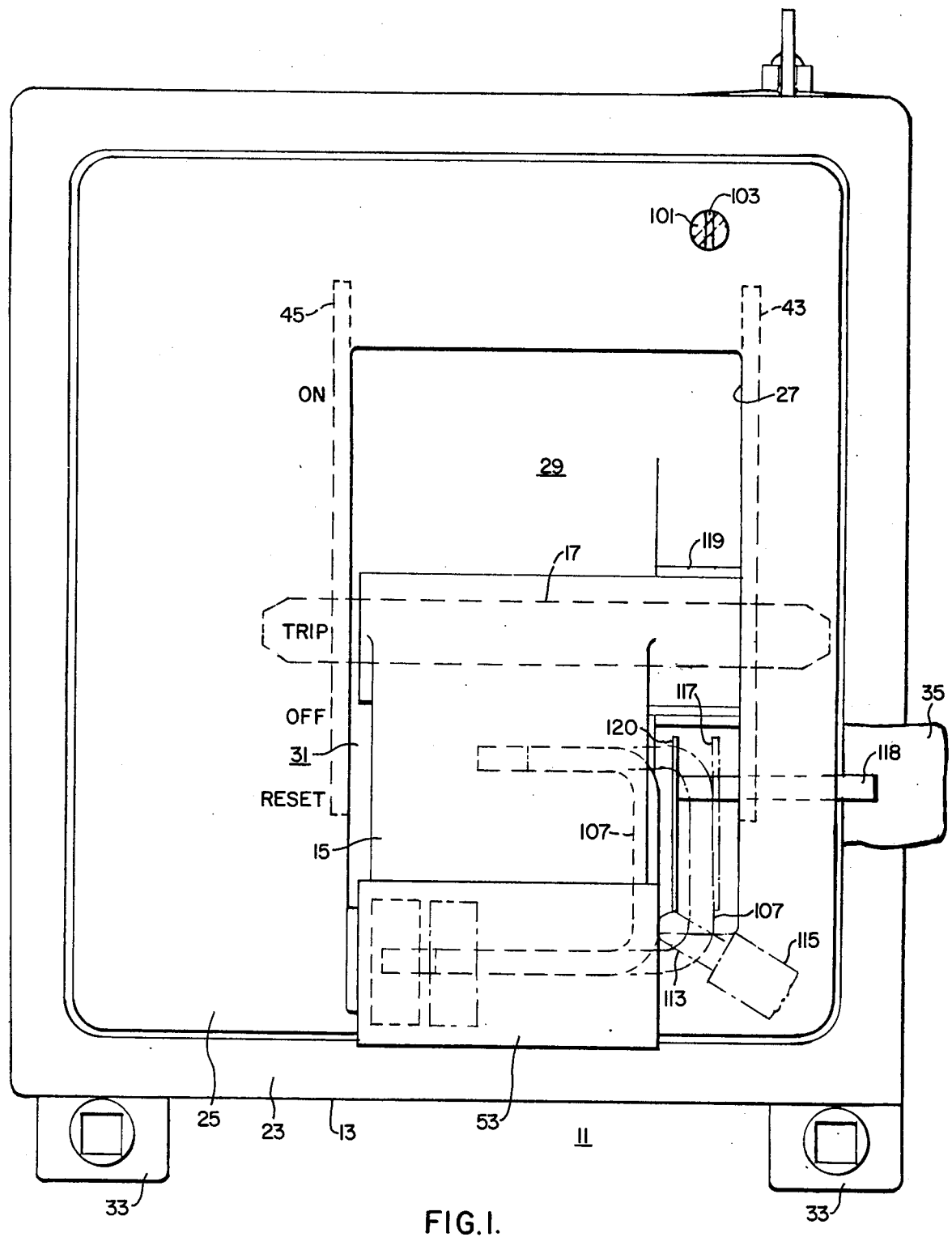
FIG. 1 is a front elevational view of the handle mechanism showing the handle in the OFF position.
Figure 2:
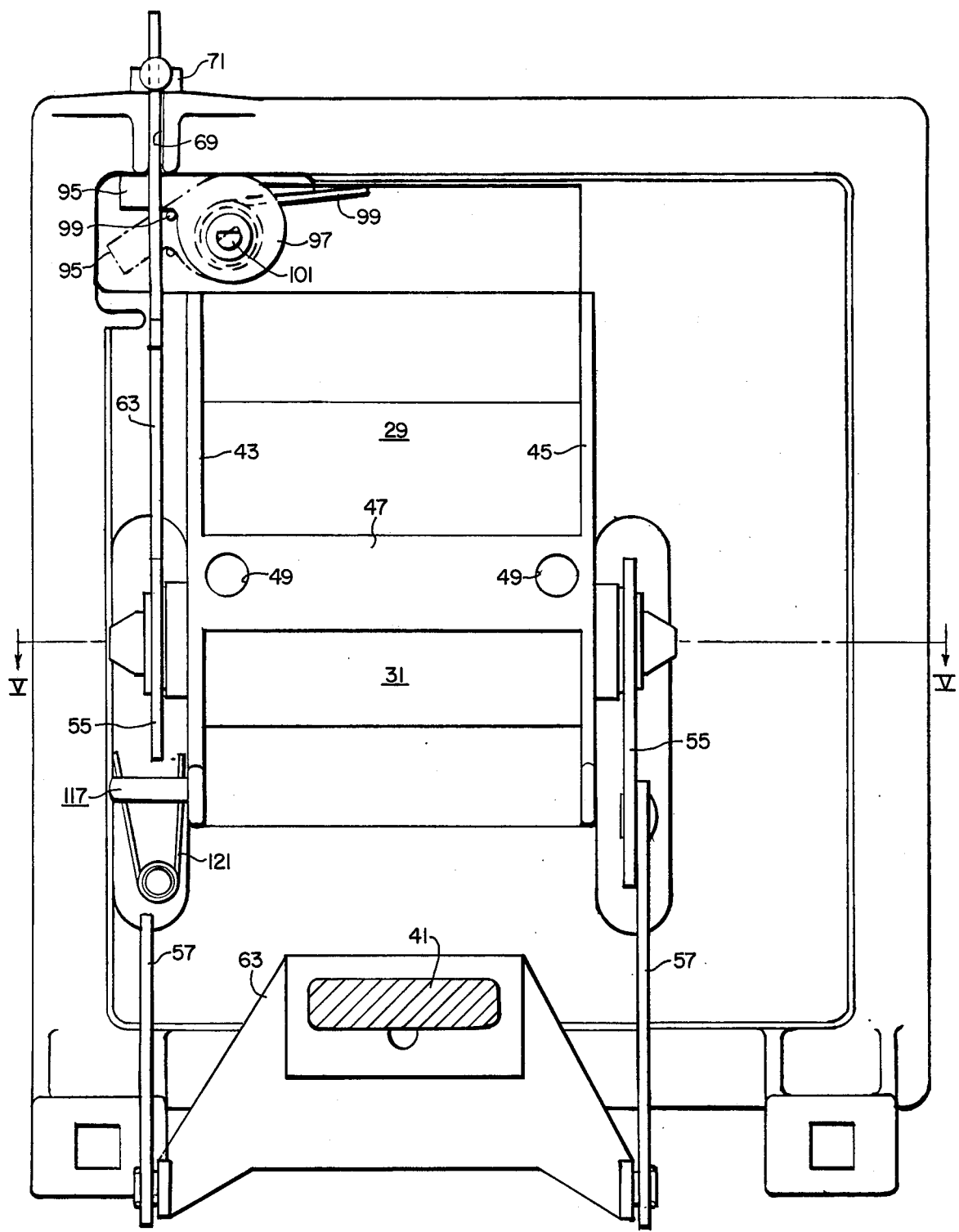
FIG. 2 is a rear elevational view of the handle mechanism.
Figure 3:
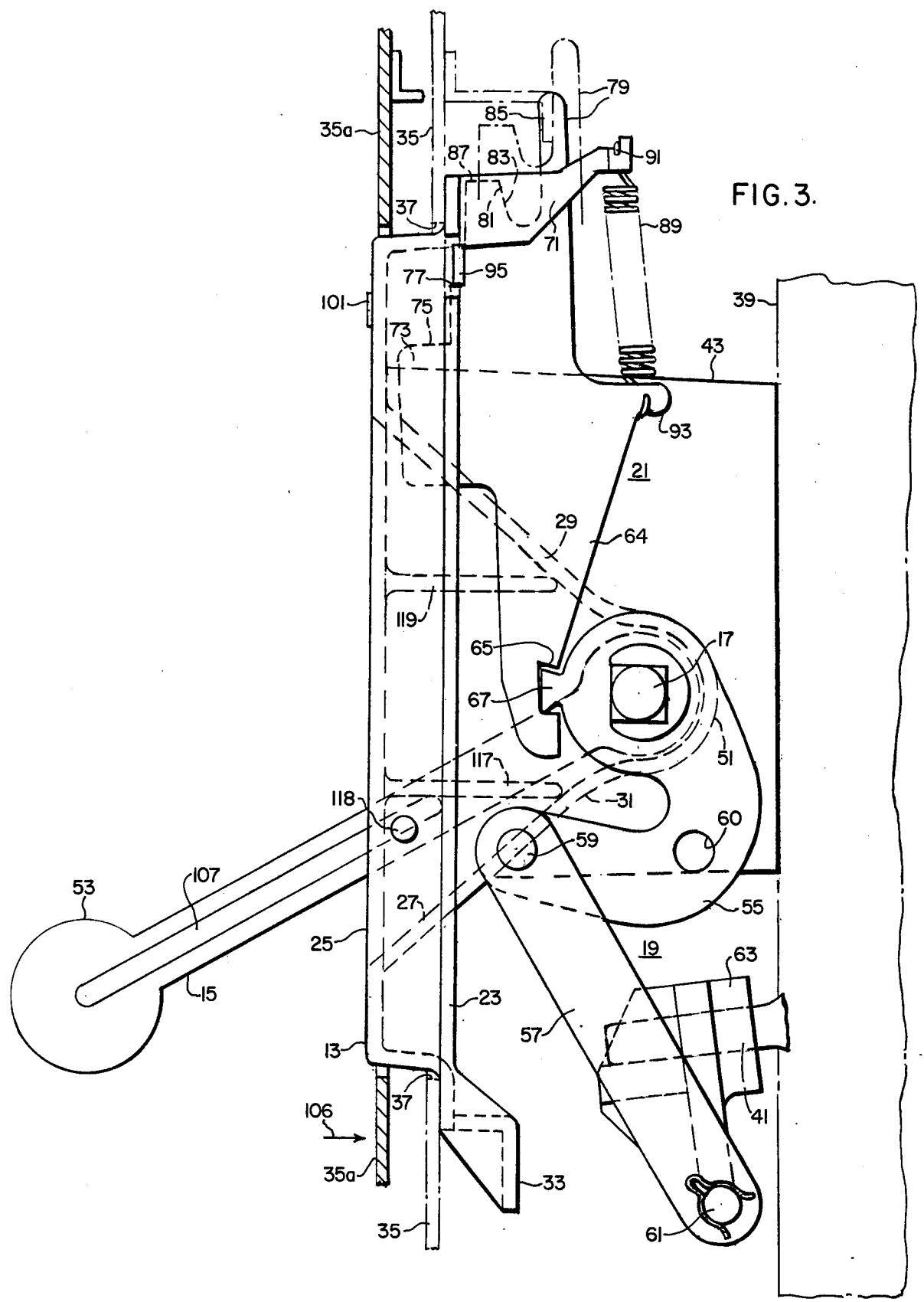
FIG. 3 is a side elevational view of the handle mechanism in the OFF position.

In FIG. 1 a handle mechanism is generally indicated at 11 and it comprises a handle mounting member 13, a handle 15, a pivot shaft 17, operating or linkage means 19 (FIG. 3), and door interlock means 21 (FIG. 3). The handle mounting member 13 is preferably molded member comprised of a metal or resinous material. The handle mounting member 13 comprises a peripheral frame 23, a front plate 25, a recess 27 defined by inturned walls 29, 31, and mounting brackets 33. As shown in FIG. 3, the handle mounting member 13 is mounted in position adjacent to a door 35 at the front of the motor control center with the front plate 25 projecting through an opening 37 in the door. The handle mounting member 13 is mounted on the front wall of a circuit interrupter or circuit breaker 39 having a vertically movable handle actuator or operator 41. The member 13 includes a pair of laterally spaced flanges 43, 45 (FIG. 2) with an interconnecting portion 47 extending therebetween and having additional holes 49 for mounting bolts (not shown).

The walls 29, 31 forming the recess 27 extend inwardly and at inclined angles from the front plate 25 where they converge into a rounded apex 51. The flanges 43, 45 form the side walls of the recess 27.

Figure 4:
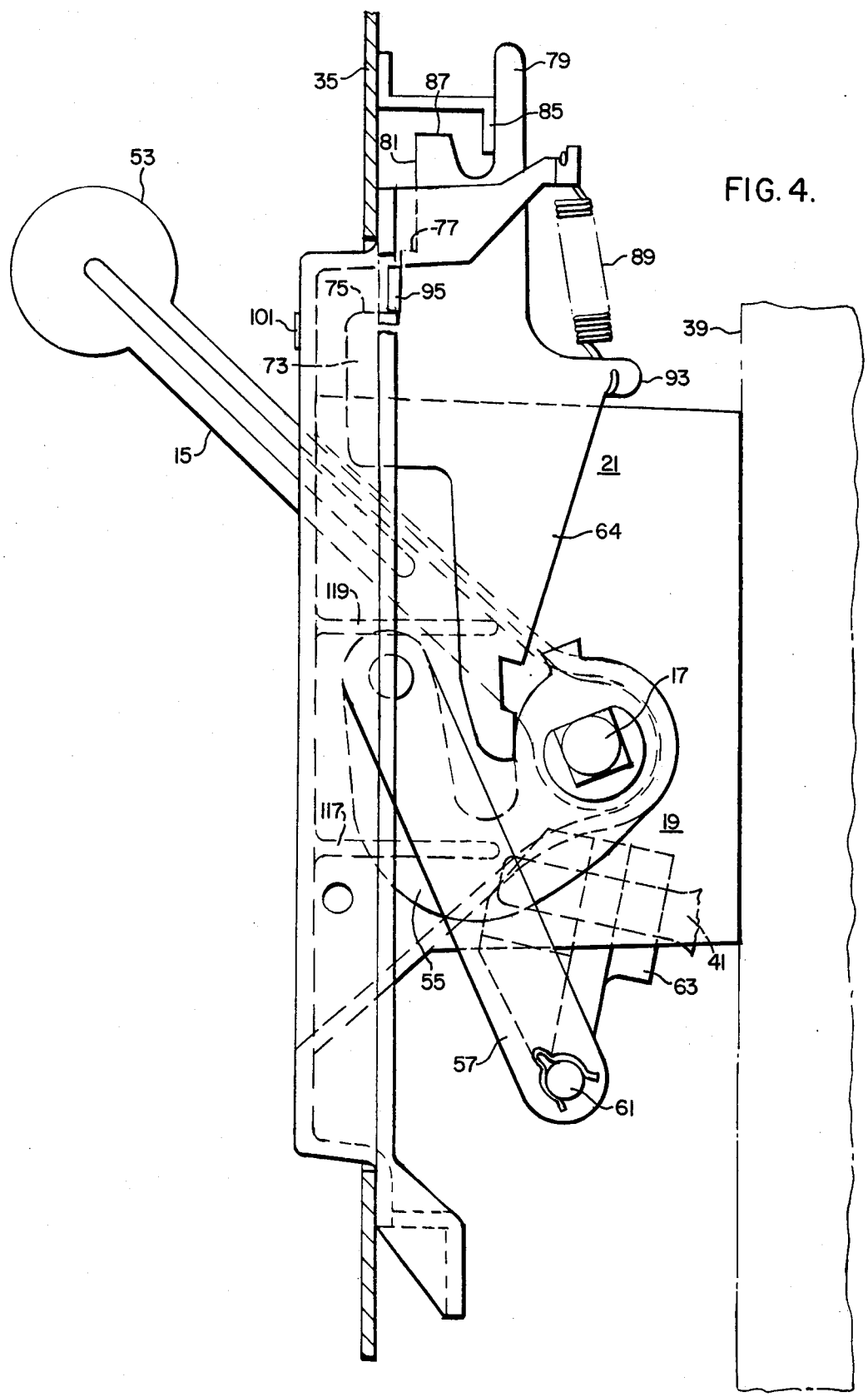
FIG. 4 is a side elevational view of the handle mechanism in the ON position.

The handle 15 projects outwardly from the recess 27 and the inner end of the handle is mounted on the pivot shaft 17 having a square cross-section so that manual rotation of the handle between the lower or OFF position and the upper or ON position of FIGS. 3 and 4, respectively, turns the shaft 17. Opposite end portions of the shaft 17 are journaled in the spaced flanges 43, 45. For convenience, the outer end of the handle 15 includes a knob 53.

The operating or linkage means 19 (FIGS. 2 and 3) comprises a lever 55 and a link 57. As shown in FIG. 2 it is preferred that a lever 55 and a link 57 be disposed at each end of the pivot shaft 17. Each link 57 is pivotally connected to a corresponding lever 55 by pivot pin 59. The lower ends of the links 57 are pivotally secured by pins 61 to an adapter 63 for holding the handle actuator or operator 41. When the handle 15 is rotated from the position of FIG. 3 to that of FIG. 4, the operator 41 on the circuit interrupter 39 is moved upwardly to the "on" or closed circuit position of the circuit interrupter. Conversely, rotation of the handle 15 from the position of FIG. 4 to that of FIG. 3, the operator 41 is moved to the "off" or open circuit position.

As shown in FIG. 3, the lever 55 may be provided with a plurality of additional holes, such as a hole 60, for accommodating the pin 59 at a radius closer to the pivot shaft 17. In this manner, the handle mechanism 11 may be used on a circuit interrupter other than the interrupter 39, having an operator which travels through a shorter distance than that of the operator 41 for the circuit interrupter 39.

The door interlock means 21 comprises a latch 64 having the configuration generally indicated in FIGS. 3 and 4; that is, the latch is a generally elongated member having a notch 65 at the lower end engaging a projection 67 on the lever 55. The upper end portion of the latch 64 is slidably mounted in a slot 69 (FIG. 2) within a bracket 71, whereby the latch is maintained in the position shown, i.e., in alignment with the lever 55. A lateral portion 73 of the latch 64 provides lower and upper edges 75 and 77 which serve as limits for upper movement of the latch 64 when the latch is in the latched and unlatched positions. The upper end of the latch 64 also includes a pair of upright projections 79 and 81 which are separated by a space 83.

As shown in FIG. 3, the circuit interrupter 39 is in the open circuit condition when the handle 15 is in the position shown. At that time the door 35 may be opened because the lever 55 pulls the latch 64 to the lowermost position as shown in FIG. 3, whereby a down-turned flange 85 mounted on the inner surface of the door 35 clears the upper end 87 of the projection 81. The latch 64 is biased by a spring 89, having its upper end secured at 91 to the outer end of the bracket 71 and the lower end secured on the latch 64, such as on a projection 93, that is located to the right of the projection 67 on the lever 55, as viewed in FIG. 3. Accordingly, when the handle 15 is rotated to the position of FIG. 3 the latch 64 is rotated counterclockwise by the spring 89 to the solid line position of the latch. In that position the upper edge 77 is disposed below a detent 95 which projects from a cam 97 (FIG. 2) and which is retained in the upper or solid line position by a wire spring 99. The cam 97 is mounted on a pin 101. The outer end of the pin 101 extends through the front plate 25 where it is provided with a slot 103 (FIG. 1) for a screwdriver or other suitable implement.

When the upper edge 77 is against the detent 95, as shown in FIG. 3, the latch plate 64 locks the lever 55 in place. Thus, when the door 35 is open, the handle 15 cannot be moved from the OFF to the ON position, thereby providing an unsafe condition for operating personnel.

When the door is closed, as in the direction of the arrow 106 (FIG. 3), and as the door moves from the position 35a to the closed position, the flange 85 strikes the projection 79 and rotates the latch 64 around the projection 67, causing the upper edge 77 to move to the right of the detent 95. As a result, the handle 15 is free to move to the ON position. Then the lower edge 75 is adjacent to the detent 95, and the flange 85 projects into the space 83 (and below the upper end 87 of the projection 81), whereby the projection prevents the door 35 from being opened.

Figure 6:
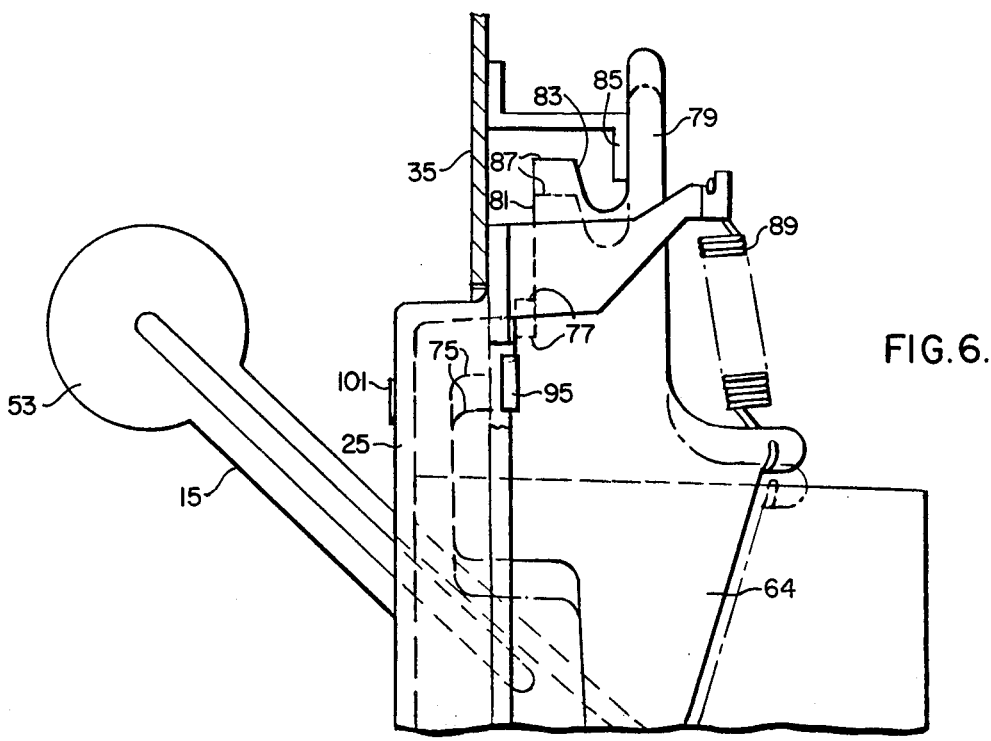
FIG. 6 is a fragmentary side elevational view showing the door interlock in the emergency open position.

There are times, however, when it is necessary to open the door 35 even though the handle 15 is in the ON position. An emergency, such as the welding of contacts within the circuit interrupter 39 due to arcing of the contacts, may occur to prevent manual opening of the circuit interrupter by moving the operator 41 down with the handle 15, as explained above. Under that condition, the latch 64 remains in the latched position (FIG. 4). The cam 97 is then rotated by the insertion of a screwdriver or the like into the slot 103 of the pin 101. The detent 95 then moves against the lower edge 75, forcing the latch 64 down, so that the flange 85 may clear the upper end 87 of the projection 81 when the door is open, as shown in FIG. 6.

Figure 5:
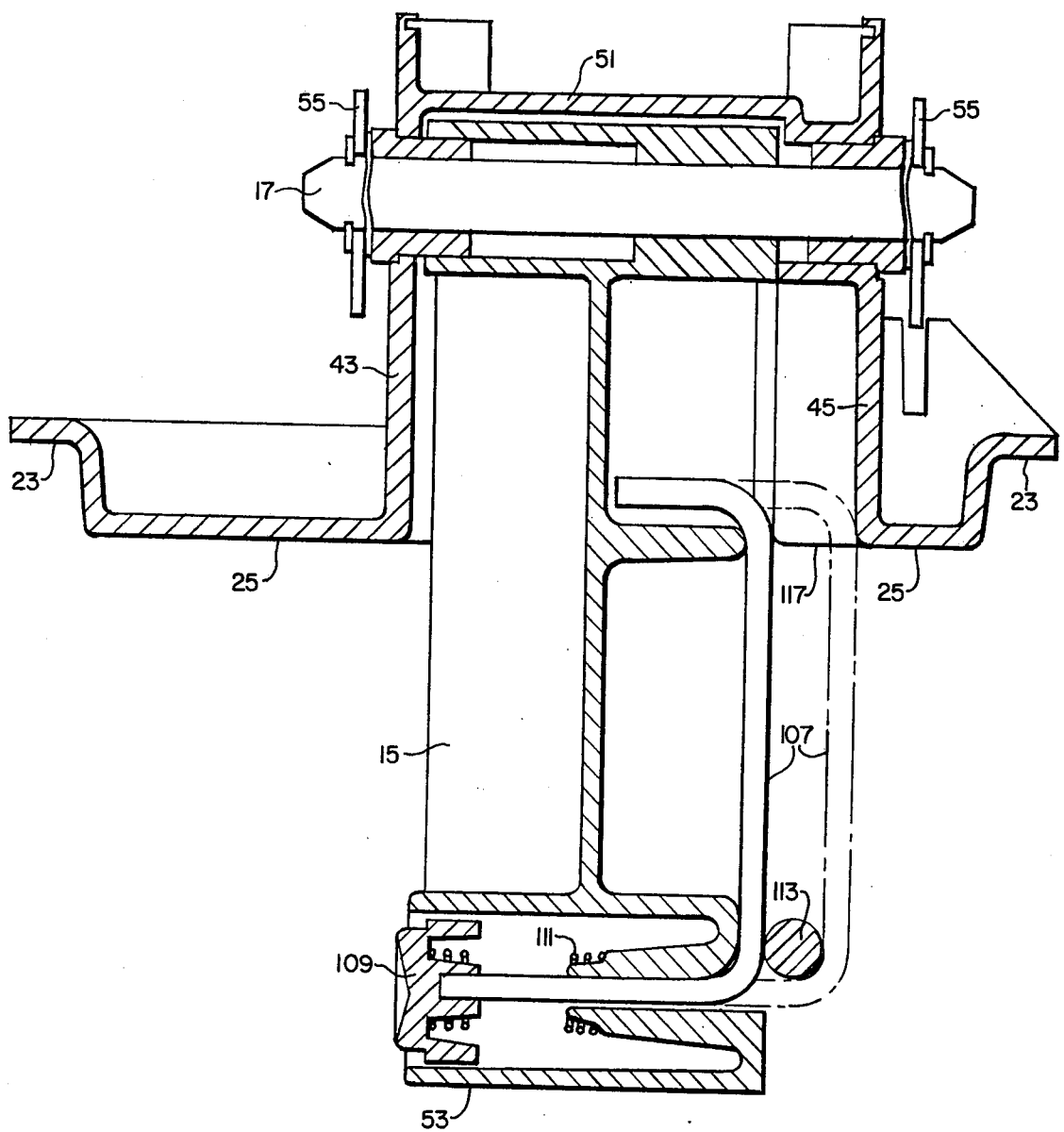
FIG. 5 is a sectional view taken on line V—V of FIG. 2.

There are times when it is necessary to lock the handle 15 in the OFF position, such as for the safety of maintenance personnel. For that purpose, a C-shaped rod 107 (FIG. 5) is mounted in the handle 15 with opposite end portions recessed within the handle. The end portion disposed in the knob 53 has a button 109 secured thereon and the assembly is retained in the retracted position by a coil spring 111, as shown in FIG. 5. To lock the handle 15 in the OFF position, the rod 107 is extended to the broken line position of the rod by pressing the button 109 inwardly. A shackle 113 of a padlock 115 (FIG. 1) may then be inserted between the extended rod 107 and the side of the handle. As shown in FIG. 1, a pair of flanges 117 and 119 project into the recess 27 from the flange 43 and into the path of movement of the rod 107 when the handle 15 is rotated. As a result when the rod 107 is padlocked in the extended position, the flange 117 interferes with any movement of the handle and prevents the closing of the circuit through the circuit interrupter 39. Under some conditions, it may be desirable to lock the handle 15 in the ON position (FIG. 4), in which case the flange 119 interferes with the extended rod 107 and prevents moving of the handle.

Under some conditions it is desirable to lock the door 35 closed when the padlock rod 107 is extended such as shown in FIG. 1. For that purpose, a lock pin 118 is provided within the front plate 25 (FIGS. 1 and 3) which pin is spaced outwardly (FIG. 3) from the peripheral flange 23 by a distance slightly greater than the thickness of the door 35. An end plate 120 (FIG. 1) is mounted on the inner end of the lock pin 118, which plate is contacted by the rod 107 when the rod is extended to the lock position (FIG. 1), thereby urging the lock pin 118 to move from a retracted position within the front plate 25 to an extended (lock) position to prevent opening of the door 35. As shown in FIG. 2, a wire spring 121 retracts the pin when the rod 107 is returned to the retracted position upon removal of the padlock shackle 113.

Figure 7:
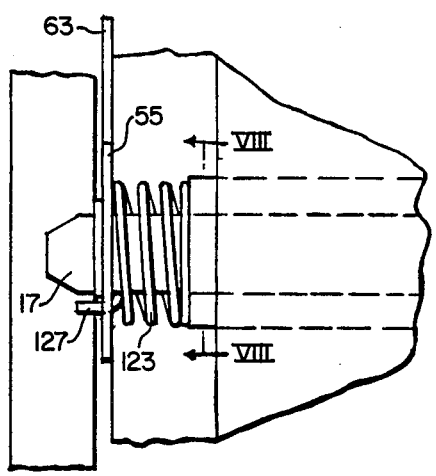
FIG. 7 is a fragmentary elevational view of another embodiment of the handle mounting shaft.
Figure 8:
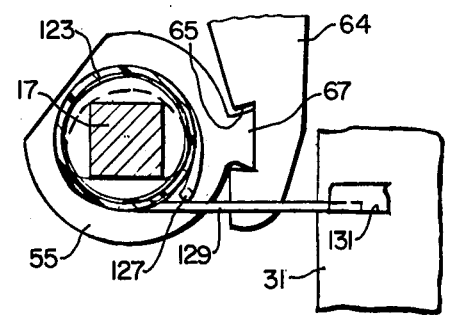
FIG. 8 is a vertical sectional view taken on the line VIII—VIII of FIG. 7.

In the embodiment of the invention shown in FIGS. 7 and 8, a torsion spring 123 is disposed on the pivot shaft 17 and is compressed between a journal 125 and the lever 55 to retain the lever in alignment with the latch 64. The spring 123 includes one end portion 127 extending through an aperture in the lever 55 and an end portion 129 (FIG. 8) extending to a retaining surface 131 in the wall 31. Thus, the spring 123 also provides a bias to the handle 15 toward the RESET position, so that the handle will properly indicate "RESET" when used with devices that have weak internal springs.

Accordingly, the handle mechanism of this invention satisfies a need for a manual handle that may be used with circuit interrupters having a range of forces required to operate and especially to reset the circuit interrupter. The handle mechanism also provides mounting means that are sufficiently rigid to enable the use of high mechanical advantage without the loss of effort due to flexing or torsion during the moment when the contacts of the circuit breaker are opening and closing. In addition, the handle mechanism provides simple ON/OFF capability with visual indication of the trip and reset positions. Finally, the handle mechanism provides a number of interlocking and padlocking options.

What is claimed is:

1. A handle mechanism for use with a circuit interrupter located within a metal enclosed control center, comprising a cabinet providing a compartment, a circuit interrupter within the compartment and having an operator for actuating the interrupter between open and closed positions, an access door to the compartment on the cabinet and having an opening therein, a handle mounting member in the compartment having a recess therein and extending through said opening, a pivot shaft journally mounted in the compartment and extending through said recess, a handle fixedly mounted on the pivot shaft and operatively connected to the operator and comprising a lever and a link, the lever being fixedly mounted on the pivot shaft, and the link being attached to the lever and to the operator.

2. The handle mechanism of claim 1 in which there is a handle mounting member comprising inturned wall means forming a recess extending into the compartment, the handle being pivotally mounted within the recess, and the pivot shaft mounting the handle and journaled within said wall means.

3. The handle mechanism of claim 2 in which interlock means are provided for holding the access door closed when the handle is in the closed position of the circuit interrupter, the interlock means comprising a latch operatively connected to the lever for movement from an unlocked to a locked position of the door when the handle is moved to the closed position.

4. The handle mechanism of claim 3 in which the latch is movable by the door between latched and unlatched positions corresponding to the open and closed positions of the handle, and the latch comprising a strike surface engaging the frame when the door is open and being disengaged upon closing the door so that the handle is movable to the closed position.

5. The handle mechanism of claim 3 in which the interlock means comprises a release cam for moving the latch to the unlatched position when the handle is in the closed position to enable opening of the door.

6. The handle mechanism of claim 5 in which the release cam comprises a turning pin extending through the frame.

7. The handle mechanism of claim 2 in which means for padlocking the handle in the open or closed position is provided, the padlock means comprising opening means for receiving a padlock shackle and holding it in the path of movement of the handle.

8. The handle mechanism of claim 7 in which the padlock means comprises a retractable member in the handle, the member comprising the opening means in which a padlock shackle is disposed when the member is extended, and a detent in the path of movement of the member when the handle is moved.

* * * * *